United States Patent
Musil et al.

(10) Patent No.: US 10,259,656 B1
(45) Date of Patent: Apr. 16, 2019

(54) SINGULATING VIBRATION FEEDER

(71) Applicant: Newtec Engineering A/S, Odense M (DK)

(72) Inventors: Jiri Musil, Plzen-Rdobycice (CZ); Anders Blicher Petersen, Odense NV (DK)

(73) Assignee: Newtec Engineering A/S, Odense M (DK)

( * ) Notice: Subject to any disclaimer, the term of this patent is extended or adjusted under 35 U.S.C. 154(b) by 0 days.

(21) Appl. No.: 16/229,517

(22) Filed: Dec. 21, 2018

Related U.S. Application Data

(63) Continuation-in-part of application No. 15/578,793, filed as application No. PCT/DK2016/000025 on Jun. 2, 2016, now Pat. No. 10,160,603.

(30) Foreign Application Priority Data

Jun. 2, 2015 (DK) ................................ 2015 00322

(51) Int. Cl.
| B65G 27/30 | (2006.01) |
| B65G 27/04 | (2006.01) |
| B65G 47/14 | (2006.01) |
| B65G 47/244 | (2006.01) |

(52) U.S. Cl.
CPC .............. B65G 27/30 (2013.01); B65G 27/04 (2013.01); B65G 47/1492 (2013.01); B65G 47/244 (2013.01); B65G 2201/0211 (2013.01); B65G 2812/0384 (2013.01)

(58) Field of Classification Search
CPC .......................... B65G 47/1492; B65G 47/244
USPC ............. 198/394, 752.1, 753, 759, 760, 766
See application file for complete search history.

(56) References Cited

U.S. PATENT DOCUMENTS

| | | | |
|---|---|---|---|
| 4,260,051 A | 4/1981 | Burghart | |
| 4,405,043 A | 9/1983 | Burghart | |
| 5,301,814 A | 4/1994 | Lower | |
| 5,314,056 A | 5/1994 | Davis | |
| 5,460,259 A | 10/1995 | Burgess, Jr. | |
| 5,967,294 A | 10/1999 | Patterson | |
| 6,702,102 B2 | 3/2004 | Kraus | |
| 6,834,756 B2 | 12/2004 | Sullivan | |
| 7,216,757 B1 | 5/2007 | Patterson | |
| 7,322,569 B2 | 1/2008 | Kraus | |
| 8,061,503 B2 | 11/2011 | Ancarani | |
| 8,770,389 B2 | 7/2014 | Millard | |
| 9,169,076 B2 | 10/2015 | Schultheis | |
| 9,266,683 B1 * | 2/2016 | Thomson | B65G 27/32 |
| 9,463,935 B1 | 10/2016 | Karpinsky | |
| 10,124,963 B1 * | 11/2018 | Steffes, Jr. | B65G 27/20 |

FOREIGN PATENT DOCUMENTS

| RU | 1791282 A1 | 1/1993 |
| SU | 563336 A1 | 6/1977 |
| SU | 1467000 A1 | 3/1989 |

\* cited by examiner

*Primary Examiner* — Douglas A Hess
(74) *Attorney, Agent, or Firm* — Harness, Dickey & Pierce, P.L.C.

(57) ABSTRACT

The problem of singulating oblong articles that are unloaded in an arbitrary orientation onto a conveyor has been solved in that the conveying trough is divided into a central, lower part and surrounding upwards-and-outwards extending parts, whereby the central part vibrates with a longitudinal amplitude that is higher than that of the upwards-and-outwards extending parts at the same frequency.

4 Claims, 3 Drawing Sheets

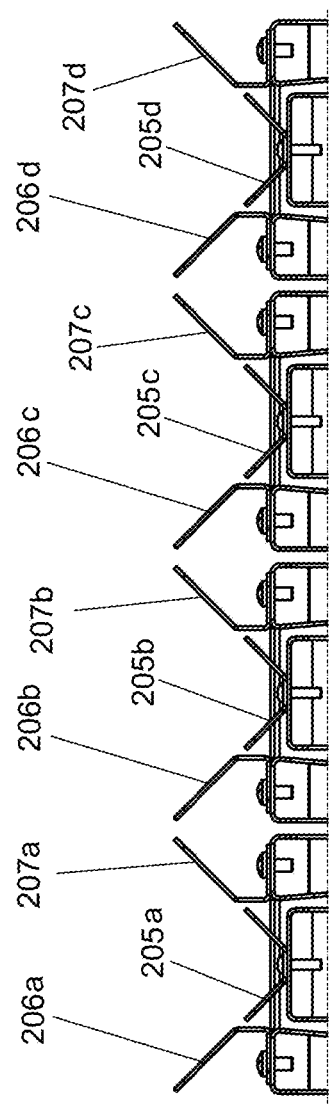

SINGULATING VIBRATION FEEDER

CROSS-REFERENCE TO RELATED APPLICATIONS

Figure 1C:
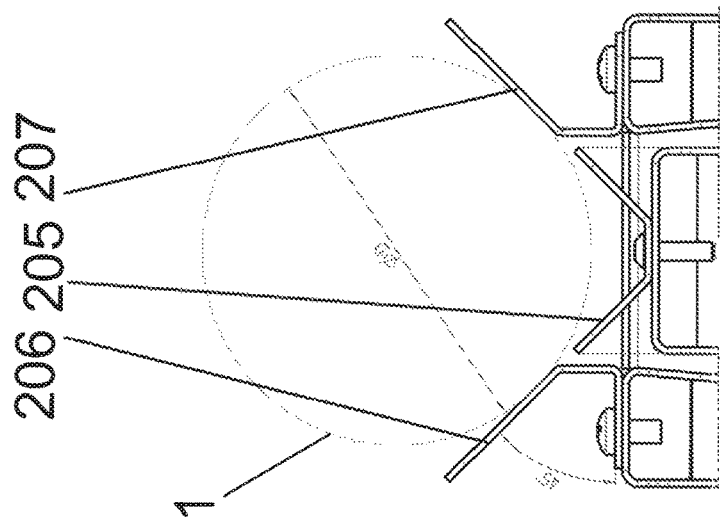

This application is a continuation-in-part of U.S. patent application Ser. No. 15/578,793 filed on Dec. 1, 2017, which is a National Stage of International Application No. PCT/DK2016/000025, filed Jun. 2, 2016. The entire disclosures of each of the above applications are incorporated herein by reference.

FIELD

The invention relates to a feeder or conveyor for articles that are able be oriented in a longitudinal direction, such as certain oblong vegetables, e.g. carrots, fruit, or certain varieties of potato. It is desirable to perform unravelling of a portion as well as singulation, which is a term for conveying the articles in a single row.

BACKGROUND

Singulators are used when a clump or pack of items are collected, and it is desired to transport them singly for further processing, such as packing, counting, or grading. A particular problem is met when it is desired to pack items into bags, for instance fruits that are portioned by counting or weighing. If the dimension of the fruit is so large that two pieces of fruit cannot pass the opening of the bag simultaneously, there is a considerable risk of jamming, which causes delays. Jams may be sorted out, but it takes time, has to occur against the friction of the conveyor belt that carries the fruit, and against the time pressure of more fruit arriving. In the case of grading, if the product is not singulated properly and overlaps appear, correct grading is not possible or very difficult as it can be very hard to distinguish between the items. For this reason it is considered preferable to have the fruit arrive one at a time, but in quick succession.

One solution for this may be found in U.S. Pat. No. 5,314,056, which describes a conveying device having a guide trough extending longitudinally from a receiving end to a discharge end, the trough having inclined and transversely-opposed sidewalls in which travels an endless feed belt longitudinally through the guide trough from the receiving end to the discharge end, the feed belt having upwardly extending outer portions which are slideably supported on the inclined sidewalls of the guide trough, the feed belt forming a concave conveyor surface for conveying food articles through the guide trough. The trough with the upwards-facing conveying feed belt is continuously vibrated. The combination of the two movements ensures the conveying and singulation, however it is a complex apparatus with fast-moving parts and involving wear of the feed belt mechanism. Another problem with this principle of operation is that it is not capable of quick start and stop, which is a requirement in high-speed handling of products.

SUMMARY

Wear is avoided in constructions of conveyors involving vibrational drives of the electromagnetic and piezoelectric types, and many such constructions have been described in the art. A preferable type is the dynamically balanced type, in which a conveying trough is vibrated with respect to a counterweight in order to reduce the reaction forces transmitted to the support structure. A construction of this type may be found in U.S. Pat. No. 4,260,051, which describes a conveying device in the form of an elongated trough resiliently connected to a surrounding frame functioning as a counterweight, and driving means to reciprocally drive said components in opposed relative directions. While this construction is outwardly vibration-free and will singulate round products that are capable of rolling in any direction, it does not work well with oblong products, unless a long section of apparatus is used.

There is hence a need for an apparatus that avoids the above limitations and has a high capacity per unit length of conveyor.

This is obtained in a construction based on balanced vibrational conveying at a particular frequency that will perform both singulation and conveying while having few moving parts and no frictional wear, which is particular in that each sidewall of the conveying trough is in three parts, a lower part forming part of a shallow trough connected to means that cause its longitudinal vibration, and a pair of upwards-and-outwards extending parts connected to further means that enable a longitudinal reciprocating movement at said particular frequency that has a smaller amplitude than the longitudinal vibration of the lower part.

DRAWINGS

Figure 1B:
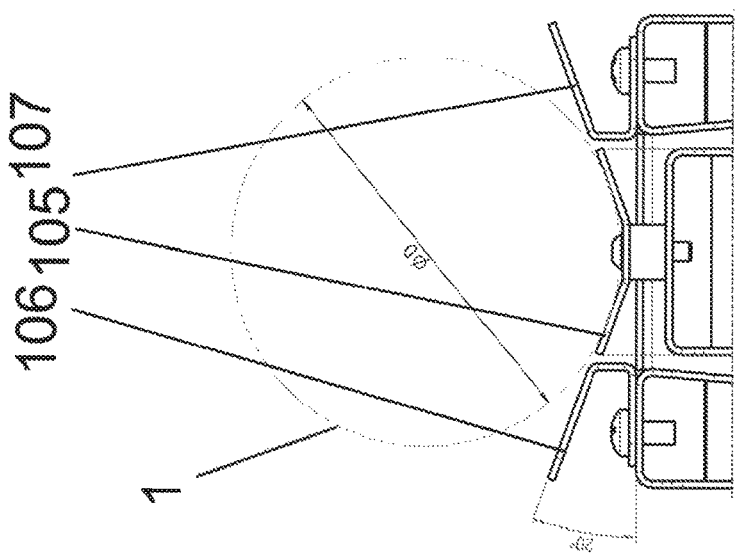
Figure 3:
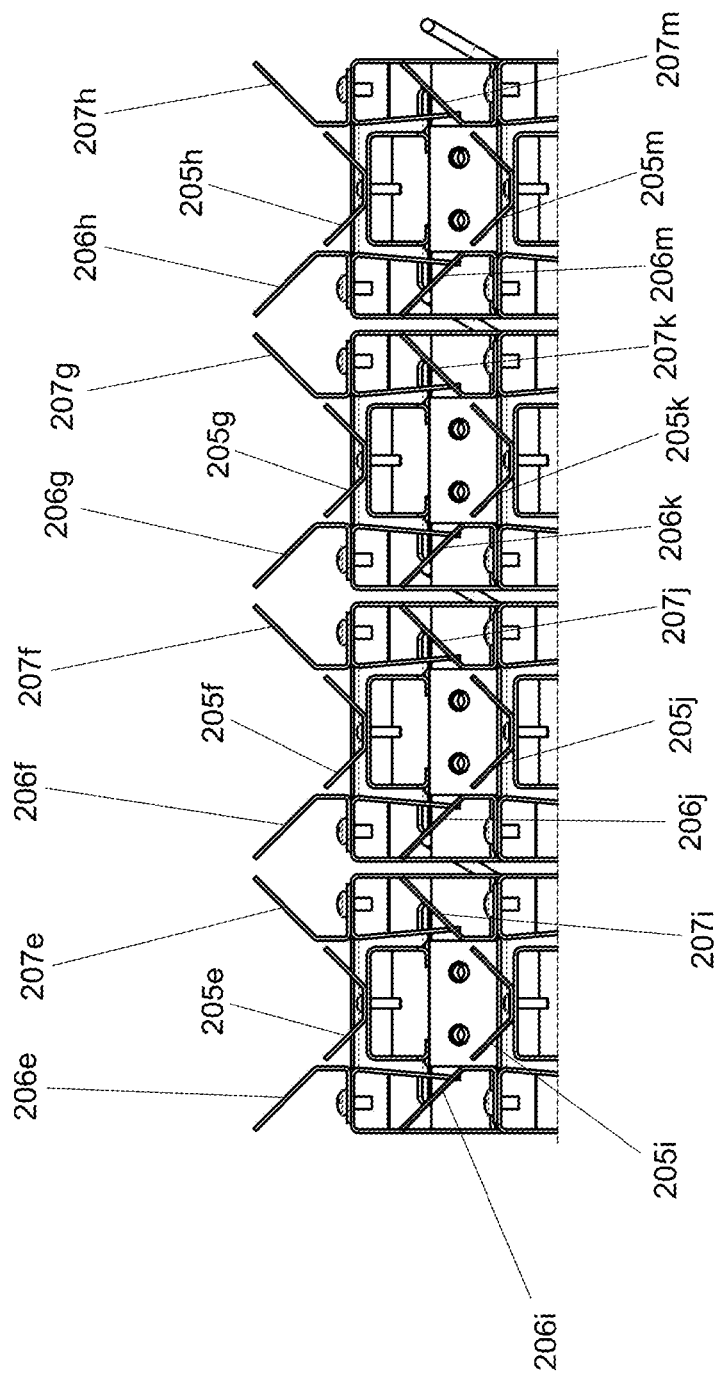

With reference to the drawing embodiments of the invention will be described in further detail. In the drawings, FIGS. 1A, 1B and 1C show a cross section of a vibrator/singulator according to the invention in different situations with respect to a given product, FIG. 2 shows a cross section of different embodiment of the invention, and FIG. 3 shows a cross section of an alternative embodiment.

DETAILED DESCRIPTION

Figure 1A:
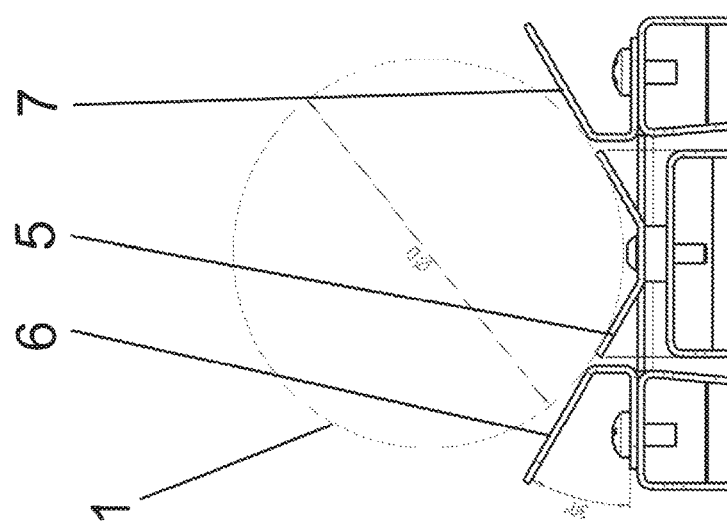

FIG. 1A shows a cross section of the invention, it is a cross section of trough in 3 parts that are able to move in and out of the plane of the drawing. During operation the cross sections 6 and 7 are locked to each other and move together with a given longitudinal ampliture. Cross section 5 also moves in and out of the plane of the drawing, but with a larger longitudinal amplitude. It will be understood that good operation depends on the product 1, shown in its widest cross section, touching both the bottom 5 and the upwards-and-outwards projecting sides 6 and 7, at least intermittently, as shown. This requires that the conveyor/singulator fits the product. In FIG. 1B is shown a conveyor/singulator that is too wide: the product only touches the bottom 105. In FIG. 1C is shown a conveyor/singulator that is too narrow: the product rides on the sides 206, 207 without touching the bottom 205. It is considered within the capability of the skilled person to adapt the conveyor/singulator to the product at hand.

In order to increase the capacity of a vibration conveyor/singulator according to the invention it is advantageous to provide several units in parallel, either side-by-side or stacked vertically. It may be advantageous to let 2 or more conveyor/singulators share a driving vibrator. It is considered within the capabilities of the skilled person to arrange such an increase in capacity.

In FIG. 2 is shown a side-by-side arrangement, and for clarity the reference numerals reflect that the elements constituting the troughs are made after the pattern in FIG. 1C. All elements 205a-d move synchronously as do the elements 206a-d and 207a-d, with the proviso as above that the longitudinal amplitude (i.e. in and out of the plane of the drawing) of the bottom elements of the trough 205a-d are larger than the longitudinal amplitudes of the upper side elements 206a-d and 207a-d.

In FIG. 3 is shown a vertical disposition, in that the combination of elements 205e, 206e, and 207e constituting a trough are stacked, i.e. disposed vertically above elements 205i, 206i, and 207i constituting a parallel trough. Similarly, elements 205f, 206f, 207f are stacked above elements 205j, 206j, and 207j. Again, similarly, elements 205g, 206g, and 207g are stacked above elements 205k, 206k, and 207k as are elements 205h, 206h, and 207g above elements 205m, 206m, and 207m. The reference numeral/letter 'l' has been skipped for clarity, because in the font used the similarity to the numeral 'one' may confuse. All the elements shown in cross section move in and out of the plane of the drawing in a longitudinal manner, however as described above, the amplitude of longitudinal movement of elements representing the bottom of the trough is larger than the amplitude of the elements representing the sides only. FIG. 3 may also be regarded as a vertical stacking of the sideways arrangement shown in FIG. 2

In conclusion, the problem of singulating oblong articles that are unloaded in an arbitrary orientation onto a conveyor has been solved in that the conveying trough is divided into a central, lower part and surrounding upwards-and-outwards extending parts, whereby the central part vibrates with a longitudinal amplitude that is higher than that of the upwards-and-outwards extending parts, whereby the efficiency of the singulation is ensured by proper dimensioning of the elements of the trough. Furthermore the capacity is increased by a side-by-side disposition of multiple troughs.

The foregoing description of the specific embodiments will so fully reveal the general nature of the present invention that others skilled in the art can, by applying current knowledge, readily modify or adapt for various applications such specific embodiments without undue experimentation and without departing from the generic concept, and therefore, such adaptations and modifications should and are intended to be comprehended within the meaning and range of equivalents of the disclosed embodiments. It is to be understood that the phraseology or terminology employed herein is for the purpose of description and not of limitation. The means, materials, and steps for carrying out various disclosed functions may take a variety of forms without departing from the invention.

Thus, the expressions "means to . . . " and "means for . . . ", or any method step language, as may be found in the specification above and/or in the claims below, followed by a functional statement, are intended to define and cover whatever structural, physical, chemical, or electrical element or structure, or whatever method step, which may now or in the future exist which carries out the recited functions, whether or not precisely equivalent to the embodiment or embodiments disclosed in the specification above, i.e., other means or steps for carrying out the same function can be used; and it is intended that such expressions be given their broadest interpretation.

What is claimed is:

1. A vibrating conveyor/singulator based on the dynamically balanced principle with a counterweight, parts of which extend along a conveying trough, creating a relative movement with a particular frequency, comprising a conveying trough defined by three parts, a lower part forming part of a shallow trough connected to a vibration driver that cause its longitudinal vibration, and a pair of upwards-and-outwards extending parts disposed along opposite sides of the lower part and connected to means that enable a longitudinal reciprocating movement at said particular frequency and at a smaller amplitude than the longitudinal vibration of the lower part, in which the angle between the sides of the lower part as well as the angle between the upwards-and-outwards extending parts is adjusted according to the transverse diameter of produce to be conveyed/singulated.

2. A vibrating conveyor/singulator based on the dynamically balanced principle with a counterweight, parts of which extend along a conveying trough, creating a relative movement with a particular frequency, comprising a conveying trough defined by three parts, a lower part forming part of a shallow trough connected to a vibration driver that cause its longitudinal vibration, and a pair of upwards-and-outwards extending parts disposed along opposite sides of the lower part and connected to means that enable a longitudinal reciprocating movement at said particular frequency and at a smaller amplitude than the longitudinal vibration of the lower part, in which a plurality of troughs, each consisting of a central part and upwards-and-outwards extending parts, are connected in parallel.

3. A vibrating conveyor/singulator according to claim 2, in which the troughs are put side by side.

4. A vibrating conveyor/singulator according to claim 2, in which the troughs are stacked on top of each other.

* * * * *